April 28, 1964  W. E. HEUMANN  3,130,452

APPARATUS FOR MOLDING THERMOPLASTIC MATERIALS

Filed Dec. 18, 1961

Walter E. Heumann INVENTOR

BY

PATENT ATTORNEY

United States Patent Office 3,130,452
Patented Apr. 28, 1964

3,130,452
APPARATUS FOR MOLDING THERMOPLASTIC MATERIALS
Walter E. Heumann, Jersey City, N.J., assignor to Esso Research and Engineering Company, a corporation of Delaware
Filed Dec. 18, 1961, Ser. No. 160,095
2 Claims. (Cl. 18—30)

This invention relates to the production of molded thermoplastic materials such as polyethylene or polypropylene. More particularly the invention relates to apparatus for dispersing pigments in such polymers during injection molding procedures.

A major object of the invention is to provide a means for dispersing pigment in a thermoplastic being subjected to injection molding techniques or to form pigment masterbatch extensions.

Another object of the invention is to provide an apparatus for combining additional ingredients with thermoplastic materials in finely divided and uniformly distributed form.

A further object of the invention is to provide a novel dispersion device for use in injection molding machines or the like.

These and further objects of the invention will be more readily apparent in the following description and drawings.

In accordance with the invention, pellets of a thermoplastic material and a dry pigment are placed together in a drum and the contents are revolved end over end until all the pellets are uniformly coated with pigment. The dusted pellets are then placed into an injection machine hopper and molded into finished articles. The injection molding machine is provided with a heating cylinder to melt the pellets and a nozzle to extrude the melt. A dispersion device is inserted into the nozzle to break down the pigment agglomerate in the melt and to disperse the pigment thoroughly throughout the plastic melt. A dispersion device particularly suitable for use in this invention comprises a truncated cone-shaped body having a plurality of channels leading inwardly from the base to a hollow spherical chamber and a lesser number of channels leading from the chamber to the surface of the truncated apex. When used for the purposes of the present invention, the dispersion device is positioned so that the base is directed to receive the melt as it passes into the mold. The exit channels from the chamber lead directly into the extrusion nozzle through the surface of the truncated apex.

The invention will be more readily understood by reference to the following detailed description taken in connection with the accompanying drawings in which.

Figure 1:
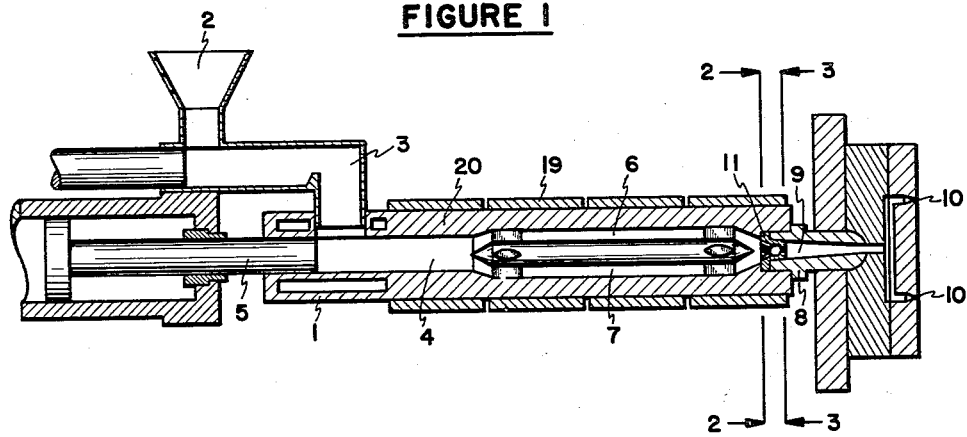
FIGURE 1 is a cross-sectional view of an injection molding machine with the dispersion device in place.
Figure 2:
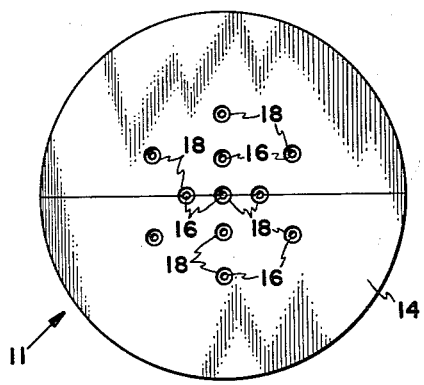
FIGURE 2 is a view of the base of the dispersion device taken along lines 2—2 of FIGURE 1.

Referring now to FIGURE 1 there is a hopper 2 for receiving the thermoplastic material to be treated and a passageway 3 connecting the hopper with main passageway 4. The thermoplastic materials are forced through passageway 4 by means of piston 5 driven by means not shown. Passageway 4 separates into twin passageways 6 and 7 and converge at nozzle 8 fitted with bore 9 and discharge ports 10. The entrance to nozzle 8 is fitted with a dispersion device 11.

Figure 4:
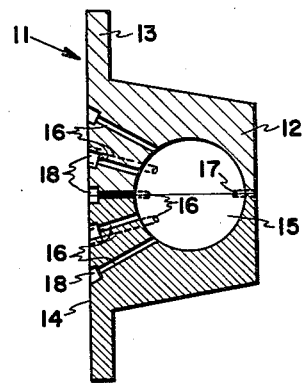
FIGURE 4 is an enlarged cross-sectional view of the dispersion device shown in FIGURE 1.
Figure 3:
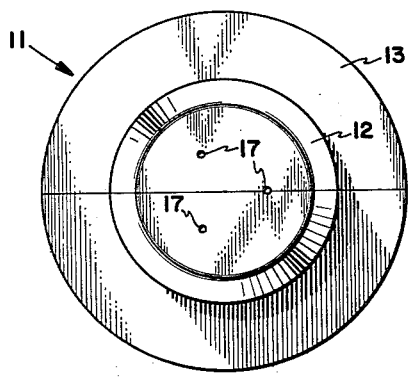
FIGURE 3 is a view of the truncated apex of the dispersion device taken along lines 3—3 of FIGURE 1.

As shown more clearly in FIGURE 4, the dispersion device consists of a substantially tapered body portion 12 provided with flange 13 forming a flat face or base 14 at the point of convergence of passageways 6 and 7. Interiorly of body portion 12 is hollow sphere 15 connecting with face 14 by channels 16 and with bore 9 by channels 17. Channels 16 have an enlarged mouth portion 18 extending a short distance from the face 14, said mouth portion preceding and communicating with a narrower neck portion of these channels. The number of the channels 16 may vary from 25 to 5 and channels 17 from 11 to 3. The length of the narrower, or neck portions of channels 16 should have a land length of 0.025 to 0.050, preferably 0.030 inch. The diameter of the narrower portion of channels 16 and also of channels 17 should be about 0.025 to 0.050 inch, preferably 0.030 inch.

The operation of the apparatus may be readily understood from the foregoing description but for convenience will be summarized as follows. Pigment coated pellets of a thermoplastic material such as a polyolefin, e.g., polyethylene or polypropylene is introduced into hopper 2 and passes by passageway 3 into passageway 4 and is forced through passageway 4 and twin passageways 6 and 7 and through channels 16 which lead at converging angles relative to each other into the hollow sphere 15 by means of piston 5. Passageways 4, 6, and 7 are preferably kept at a controlled temperature by any suitable means. FIGURE 1 shows heating bands 19 used for controlling the melt temperature, surrounding the jacket around these passageways. A mechanical force is employed in forcing the thermoplastic materials through the passageways into the hollow sphere and then into the mold. The heat control through cylinder 20 will adjust the temperature in any case so that as the material is extruded, it will be substantially melted so that the pigment will be uniformly distributed throughout the melt as a result of passage through the channels 16 into the hollow sphere and out through channels 17.

Different colored pigments (yellow, blue, green and pink) were tested at concentrations ranging from 0.2 wt. percent to 1.5 wt. percent and the molded items showed good pigment dispersion. This is in contrast with the results obtained by using dispersion disks consisting of flat plates with a plurality of holes drilled through them and no internal hollow sphere. Only poor to fair pigment dispersions were obtained under these conditions.

The dispersion device of the present invention may also be used to produce good colored pigment masterbatch extensions ranging from four parts polymer to 1 part pigment concentrate to 30 parts polymer to 1 part pigment concentrate. Black, white, bronze, aluminum, cream, and yellow masterbatches have all been extended successfully. All the colored masterbatches contained pigment at a 20 wt. percent concentration except the white, which contained 8 wt. percent concentrations.

The nature of the present invention having been thus fully set forth and specific examples of the same given, what is claimed as new and useful and desired to be secured by Letters Patent is:

1. In an injection molding machine having an internally heated bore and an extrusion nozzle connected with said bore, a dispersion device disposed between said bore and said nozzle, said dispersion device comprising a truncated cone-shaped body portion having a base communicating with said bore and a truncated apex communicating with said nozzle, said body surrounding an internal spherical chamber and having
  (a) a plurality of inlet channels leading at converging angles relative to each other from the base to the spherical chamber, each of said inlet channels having an enlarged mouth portion and a neck portion, said neck portion having a land length between 0.025 and 0.05 inch and a diameter of about 0.025 to 0.05 inch, and (b) a lesser number of outlet channels leading from the spherical chamber to the truncated apex, each of said outlet channels having a diameter of about 0.025 to 0.05 inch.

2. The device in claim 1 wherein the diameter of the channels is 0.030 inch.

References Cited in the file of this patent

UNITED STATES PATENTS

| | | |
|---|---|---|
| 154,544 | Doten | Sept. 1, 1874 |
| 407,237 | Payne | July 16, 1889 |
| 1,080,957 | Davis | Dec. 9, 1913 |
| 1,375,623 | Bartels | Apr. 19, 1921 |
| 2,284,255 | Baureschmidt | May 26, 1942 |
| 2,332,829 | Parsons et al. | Oct. 26, 1943 |
| 2,961,706 | Swenson | Nov. 29, 1960 |
| 2,975,478 | Finster | Mar. 21, 1961 |
| 2,977,634 | Morse | Apr. 4, 1961 |
| 2,999,274 | Silas et al. | Sept. 12, 1961 |

FOREIGN PATENTS

| | | |
|---|---|---|
| 615,177 | Canada | Feb. 21, 1961 |